United States Patent
Giles et al.

(10) Patent No.: US 7,165,120 B1
(45) Date of Patent: Jan. 16, 2007

(54) SERVER NODE WITH INTERATED NETWORKING CAPABILITIES

(75) Inventors: Thomas E. Giles, Union City, CA (US); Leo Hejza, Sunnyvale, CA (US); Raghvendra Singh, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 771 days.

(21) Appl. No.: 09/689,218

(22) Filed: Oct. 11, 2000

(51) Int. Cl.
*G06F 15/16* (2006.01)
*G06F 15/173* (2006.01)
*H05K 5/00* (2006.01)

(52) U.S. Cl. .................. 709/249; 709/223; 709/228; 361/724

(58) Field of Classification Search .............. 709/226, 709/249, 223; 714/11, 447; 361/686, 683; 710/316; 29/868
See application file for complete search history.

(56) References Cited

U.S. PATENT DOCUMENTS

| | | | |
|---|---|---|---|
| 5,649,108 A | | 7/1997 | Spiegel et al. |
| 5,684,671 A | * | 11/1997 | Hobbs et al. ............ 361/683 |
| 5,754,543 A | | 5/1998 | Seid |
| 5,801,921 A | * | 9/1998 | Miller ...................... 361/686 |
| 5,829,130 A | * | 11/1998 | Miller ...................... 29/868 |
| 5,841,775 A | | 11/1998 | Huang |
| 5,856,981 A | | 1/1999 | Voelker |
| 5,877,938 A | * | 3/1999 | Hobbs et al. ............ 361/724 |
| 5,881,243 A | | 3/1999 | Zaumen et al. |
| 5,913,034 A | * | 6/1999 | Malcolm .................. 709/223 |
| 6,175,490 B1 | * | 1/2001 | Papa et al. .............. 361/686 |
| 6,256,295 B1 | | 7/2001 | Callon |

(Continued)

FOREIGN PATENT DOCUMENTS

EP 0858189 A2 8/1998

OTHER PUBLICATIONS

Zaumen et al., "A Practical Approach to Minimizing Delays in Internet Routing," 5 pgs., www.soe.ucsc.edu/research/ccrg. (prior to Oct. 11, 2000).

(Continued)

*Primary Examiner*—Jeffrey Pwu
*Assistant Examiner*—Kenny Lin
(74) *Attorney, Agent, or Firm*—Blakely, Sokoloff, Taylor & Zafman LLP (57) ABSTRACT

According to one aspect of the invention, a method and apparatus for a server node is disclosed. This server node consists of one or more processors. The processors are configured to perform server functions as well as switch and router functions including load balancing and fail-over. The server nodes also have a plurality of ports. These ports allow the server nodes to be connected combined to form blocks and networks as well as to provide connection to external networks. When a server node receives a request, it determines whether it can handle the request. If possible, the server node handles the request. If the server node cannot handle the request, it routes the request to a second, neighboring server node.

16 Claims, 8 Drawing Sheets

U.S. PATENT DOCUMENTS

| | | | |
|---|---|---|---|
| 6,260,155 B1 * | 7/2001 | Dellacona | 714/4 |
| 6,411,506 B1 * | 6/2002 | Hipp et al. | 361/686 |
| 6,411,606 B1 * | 6/2002 | Moura et al. | 370/282 |
| 6,412,079 B1 * | 6/2002 | Edmonds et al. | 714/11 |
| 6,456,599 B1 | 9/2002 | Elliott | |
| 6,584,075 B1 | 6/2003 | Gupta et al. | |
| 6,658,479 B1 | 12/2003 | Zaumen et al. | |
| 6,665,822 B1 * | 12/2003 | Conway | 714/47 |
| 6,675,254 B1 * | 1/2004 | Wachel | 710/316 |

OTHER PUBLICATIONS

Srinivas Vitukury, et al., "A Simple Approximation to Minimum-Delay Routing," XP000852201, Computer Communications Review, Association for Computing Machinery, vol. 29, No. 4, pp. 227-238 (Oct. 1999).

Christos G. Cassandras, et al., "Distributed Routing with On-Line Marginal Delay Estimation," Networks: Evolution or Revolution?, XP010011723, Proceedings of the Annual Joint Conference of the Computer and Communications Socieies, vol. Conf. 7, pp. 603-612 (Mar. 27, 1998).

Zaumen et al., "Load-Balanced Anycast Routing in Computer Netork," XP002189124, Fifth IEEE Symposium on Computers and Communications, pp. 556-574 (Jul. 3-6, 2000).

* cited by examiner

SERVER NODE WITH INTERATED NETWORKING CAPABILITIES

FIELD OF THE INVENTION

This invention relates to servers in general, and more specifically to a server node with integrated networking capabilities, such as switching, routing, load balancing and fail-over capabilities.

BACKGROUND OF THE INVENTION

Network applications have placed greater demands on network servers. These demands include greater reliability, increased capacity, and the ability to easily scale to meet increasing demand. For example, Internet Service Providers (ISPs) require server networks which are scalable and highly fault tolerant.

Figure 1:
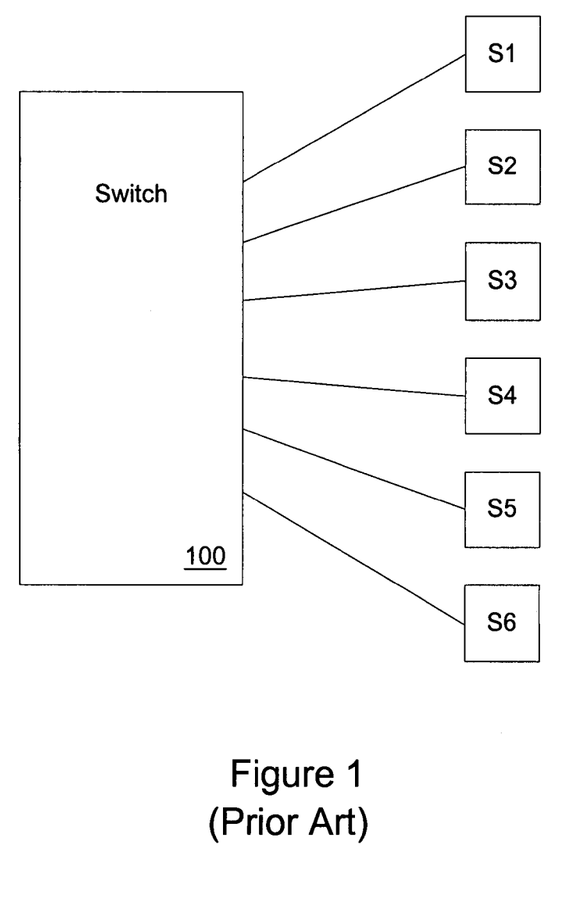
FIG. 1 is a block diagram illustrating a prior art approach to combining multiple servers.

One popular method of meeting reliability and scalability requirements is to construct server farms where several servers are combined to function as a single unit. FIG. 1 is a block diagram illustrating a prior art approach to combining multiple servers. In this example, six servers, S1–S6, are combined into a server farm. All servers S1–S6 are then connected to a shared switch 100.

Figure 2:
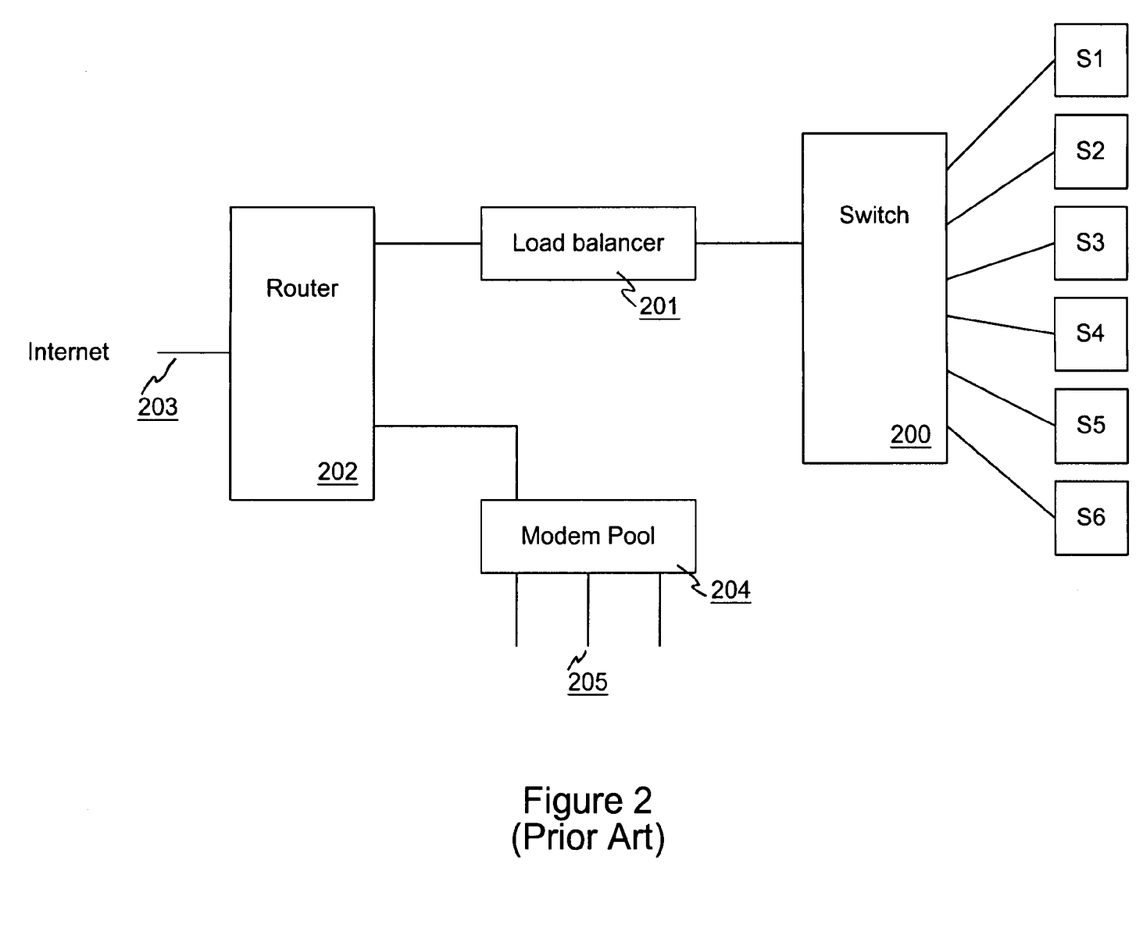
FIG. 2 is a block diagram illustrating a prior art server farm architecture.

Implementing such a server farm requires additional equipment. FIG. 2 is a block diagram illustrating a prior art server farm architecture. In this example, servers S1–S6 are combined and connected to switch 200. The switch 200 is then connected to a router 202 through a load balancer 201. The router 202 is also connected to a modem pool 204 and external networks such as the Internet 203.

However, this approach has some drawbacks. First, the various pieces of equipment such as servers, switches, routers and modems all take up space. Since, in many applications space is at a premium, a small footprint is needed. Secondly, switches have a limited number of ports. Therefore, scalability is somewhat limited. In order to add servers beyond the number of ports available on a given switch, additional switches will be required. This in turn may require the addition of more load balancers and routers. Additionally, a switch creates a single point of failure. Failure of a switch will make all servers connected to it unavailable. Sometimes redundant switches are used to address this problem but this approach further complicates scalability. Finally, external connections between the devices in such an application are slower than internal connections within a single device.

SUMMARY OF THE INVENTION

A server node with integrated networking capabilities is disclosed. According to one embodiment of the present invention, server nodes consist of one or more processors. The processors are configured to perform server functions as well as switch and router functions (e.g., network functions) including load balancing and fail-over. The server nodes also have a plurality of ports. These ports allow the server nodes to be combined to form blocks and networks as well as to provide connections to external networks.

According to another aspect of the invention, a method and apparatus for a server block is disclosed. A server block consists of a plurality of server nodes and a plurality of signal paths connected with the ports of each server node. At least one path connected with each node provides an external connection to the server block and at least two paths connected with each node are connected with other server nodes in the block. When a server node receives a request, it determines whether it can handle the request. If possible, the server node handles the request. If the server node cannot handle the request, it routes the request to a second, neighboring server node.

According to another aspect of the invention, a scalable, fault tolerant server node network topology may be constructed by interconnecting server blocks in a mesh-like topology. This computer network consists of a plurality of server blocks and a plurality of signal paths connected with the server blocks. At least one signal path connected with each server block provides an external connection to the network and at least two signal paths connected with each server block are connected with other server blocks in the network.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

A server node with integrated networking capabilities is disclosed. According to one embodiment of the invention, a server node consists of one or more processors. The processors are configured to perform server functions as well as switch and router functions. The server nodes also have a plurality of ports. These ports allow the server nodes to be connected to form blocks and networks as well as to provide connection to external networks. When a server node receives a request, it determines whether it can handle the request. If possible, the server node handles the request. If the server node cannot handle the request, it routes the request to a second, neighboring server node.

According to another embodiment of the invention, a novel grouping and interconnection of server nodes, referred to as a "server block" is disclosed. A server block consists of a plurality of server nodes and a plurality of signal paths connected with the ports of each server node. At least one path connected with each node provides an external connection to the server block and at least two paths connected with each node are connected with other server nodes in the block.

According to another embodiment of the invention, a scalable, fault tolerant server node network topology is disclosed. This server node network topology consists of a plurality of server blocks and a plurality of signal paths connected with the server blocks. At least one signal path connected with each server block provides an external connection to the network and at least two signal paths connected with each server block are connected with other server blocks in the network.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

As explained above, one method used to increase reliability and scalability has been to combine multiple servers into a server farm. This approach has drawbacks such as requiring large amounts of physical space and reduced reliability due to failures in shared equipment such as routers and switches. The present invention, instead of using separate pieces of equipment, uses a server with an integrated switch. Further, this switch includes some routing and load balancing functions. These server nodes can then be combined to form a block of servers (a "server block") that performs many of the same functions of the traditional server farms. Further, these server blocks can then be combined to build larger networks of servers that are compact in size and highly fault tolerant.

Figure 3:
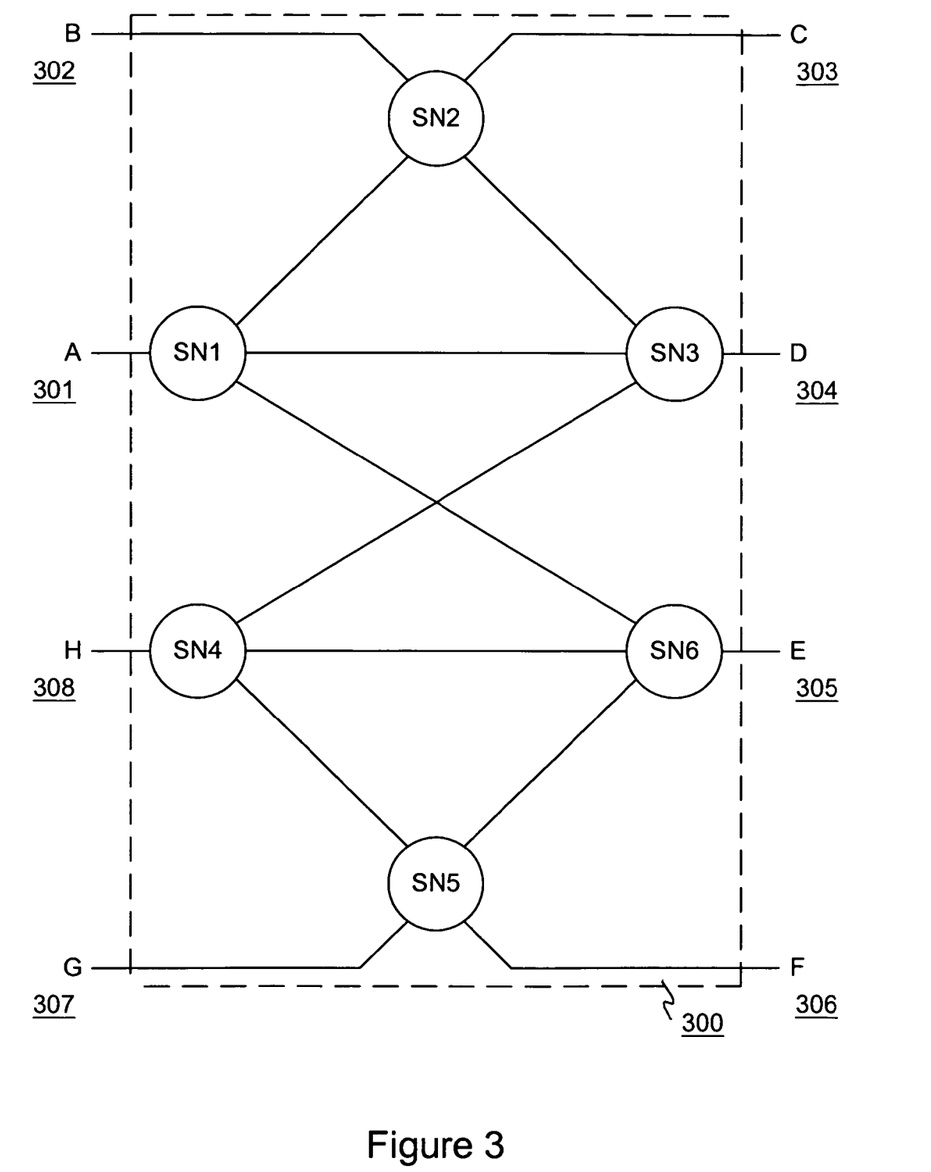
FIG. 3 is a block diagram conceptually illustrating interconnection of server nodes according to one embodiment of the present invention.

FIG. 3 is a block diagram conceptually illustrating interconnection of server nodes according to one embodiment of the present invention. This block of server nodes 300 consists of six server nodes SN1–SN6. Each server node has four ports. Server node SN1, for example, is interconnected with nodes SN2, SN3 and SN6 and one port is used for an external connection 301. Other nodes are interconnected in a similar fashion. For example, server node SN4 is interconnected with nodes SN3, SN6, and SN5 and one port is used for an external connection 308. While all nodes SN1–SN6 have four ports, not all nodes are connected to three other nodes. For example, server node SN2 is connected to two other server nodes SN1 and SN3 and has two external connections 302 and 303. Likewise, server node SN5 is connected to two other server nodes SN4 and SN6 and has two external connections 306 and 307.

Each node in the block 300 performs normal server function as well as switching, routing, load balancing, and fail-over functions. Routing gives loop free paths and automatic dealing with failed nodes but no load balancing. Load balancing can be handed in various manners but in the preferred embodiment this function is performed as detailed in co-pending U.S. patent application Ser. No. 09/607,639, now U.S. Pat. No. 6,658,479, entitled "Load-Balancing Anycasting and Routing in a Network" filed on Jun. 30, 2000. To summarize, in this embodiment, load balancing is performed by continuously calculating the load, response time and link traffic load on all possible connections and picking the one that, at this point in time, can provide the quickest response. Because this is a distributed calculation, each node does not need to know how to access all other nodes, it only needs to know how to access its neighboring nodes. Therefore, routing table can be very small since a node only needs to know its immediate neighbors and not the entire network.

Figure 4:
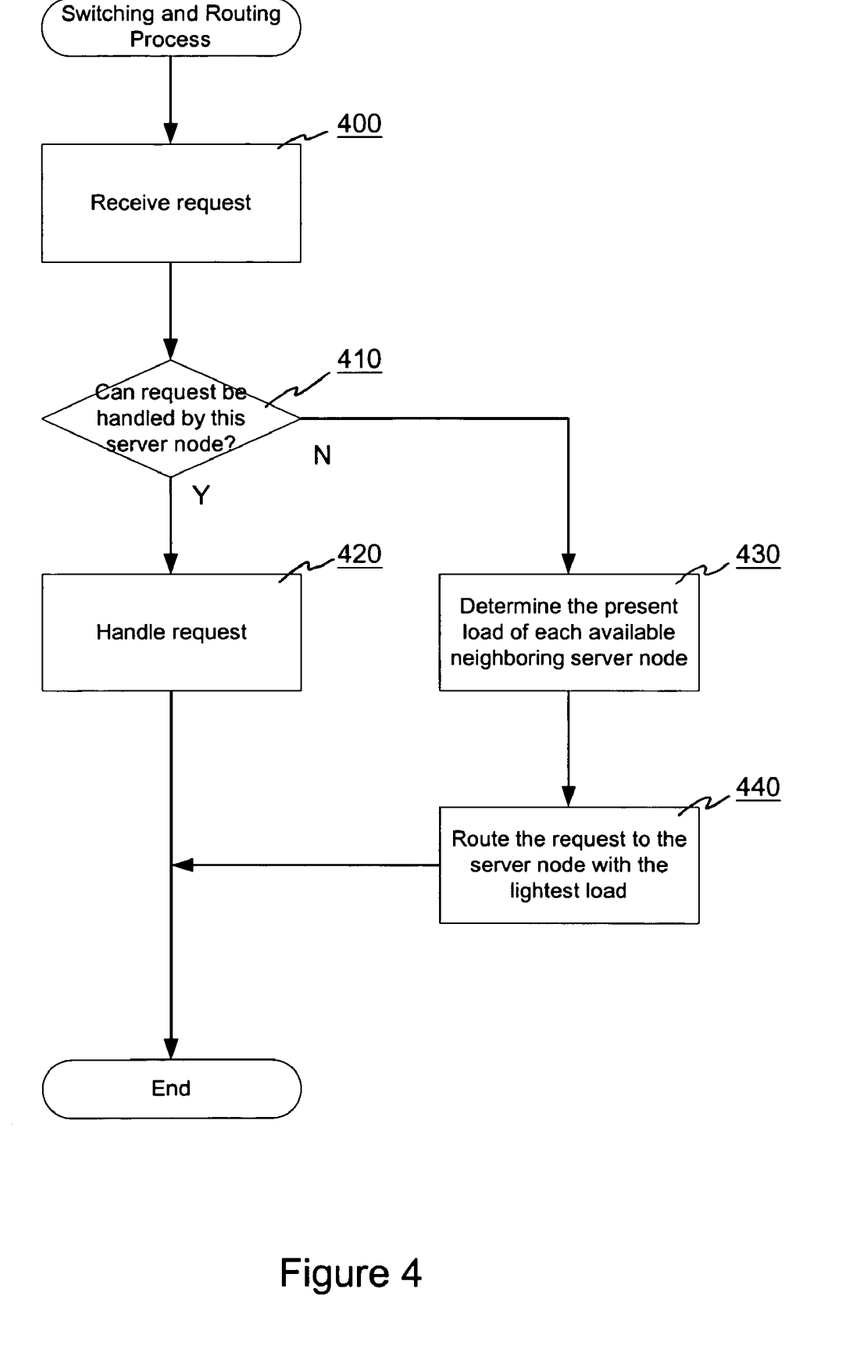
FIG. 4 is a flowchart illustrating switching and routing functions of a server node according to one embodiment of the present invention.

FIG. 4 is a flowchart illustrating switching and routing functions of a server node according to one embodiment of the present invention. First, at processing block 400, a server node receives a request. This request may be from another, neighboring server node or an external network such as the internet. The server node then determines whether it can handle this request at decision block 410. This determination may be based on the present load of the server node, whether requested information is locally available on the server node, or other considerations. If the server node is able to handle the request it does so at processing block 420. If unable to handle the request, then at processing block 430, the server node determines the present load of each available neighboring server node and routes the request to the server node with the lightest load at processing block 440.

Figure 5:
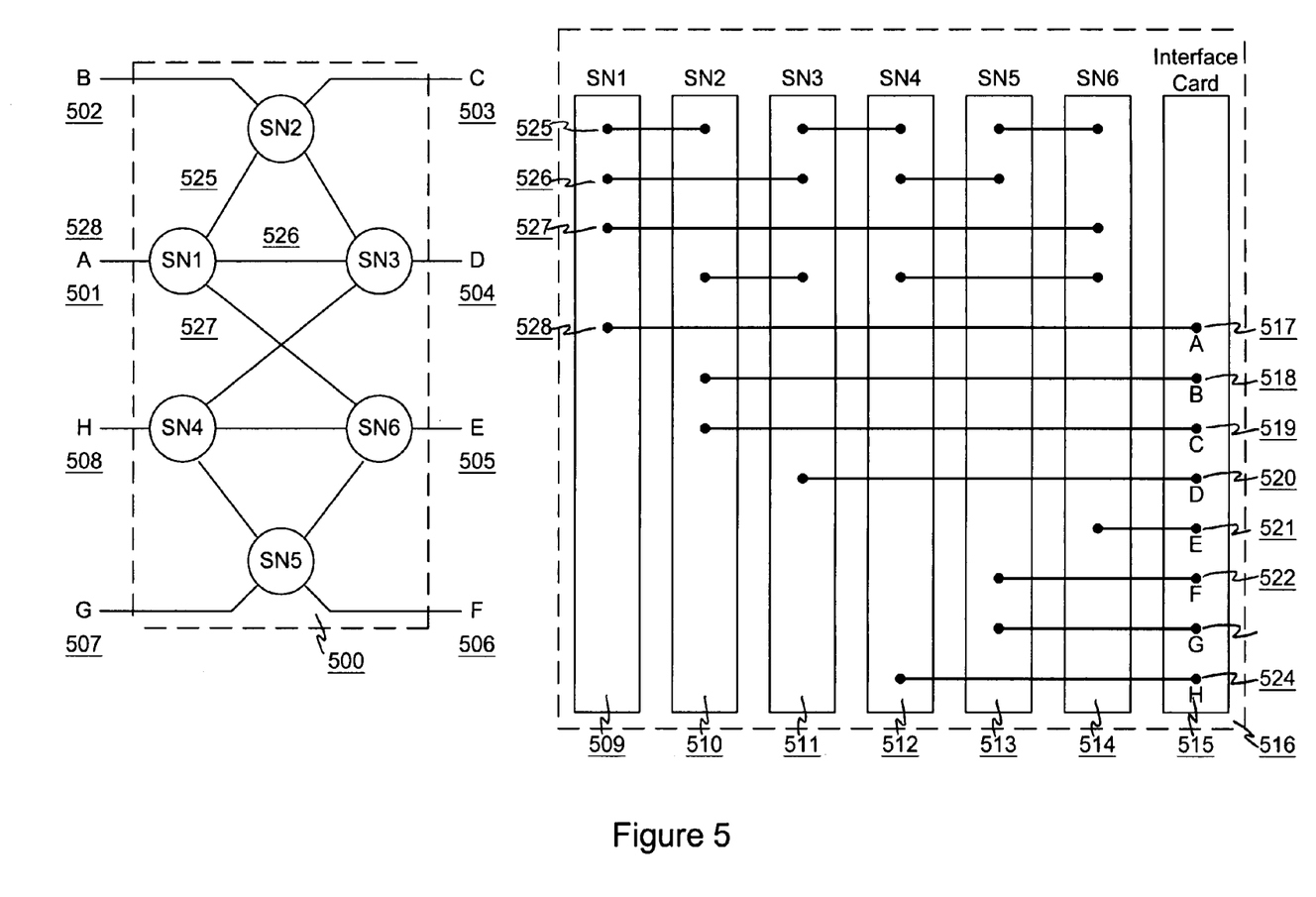
FIG. 5 is a block diagram illustrating physical interconnection of server node cards within a card rack according to one embodiment of the present invention.

FIG. 5 is a block diagram illustrating physical interconnection of server node cards within a card rack 516 according to one embodiment of the present invention. In this example, the card rack 516 implements server node block 500 which consists of six server nodes SN1–SN6. Each server node is constructed on a card represented as 509–515 that could be stored in the card rack 516. Additionally, each block includes an interface card 515. This interface card 515 provides all external connections and provides all necessary buffering. Connections between all server node cards 509–514 and between server node cards and the interface card 515 can then be made through a series of jumpers on the back of each card in the card rack 516. For example, server node card SN1 is connected to server node cards SN2, SN3, and SN6 through jumpers 525–527 and to the interface card 515 through jumper 528. The other cards in the rack are connected in similar fashion to construct the server block 500.

Figure 6:
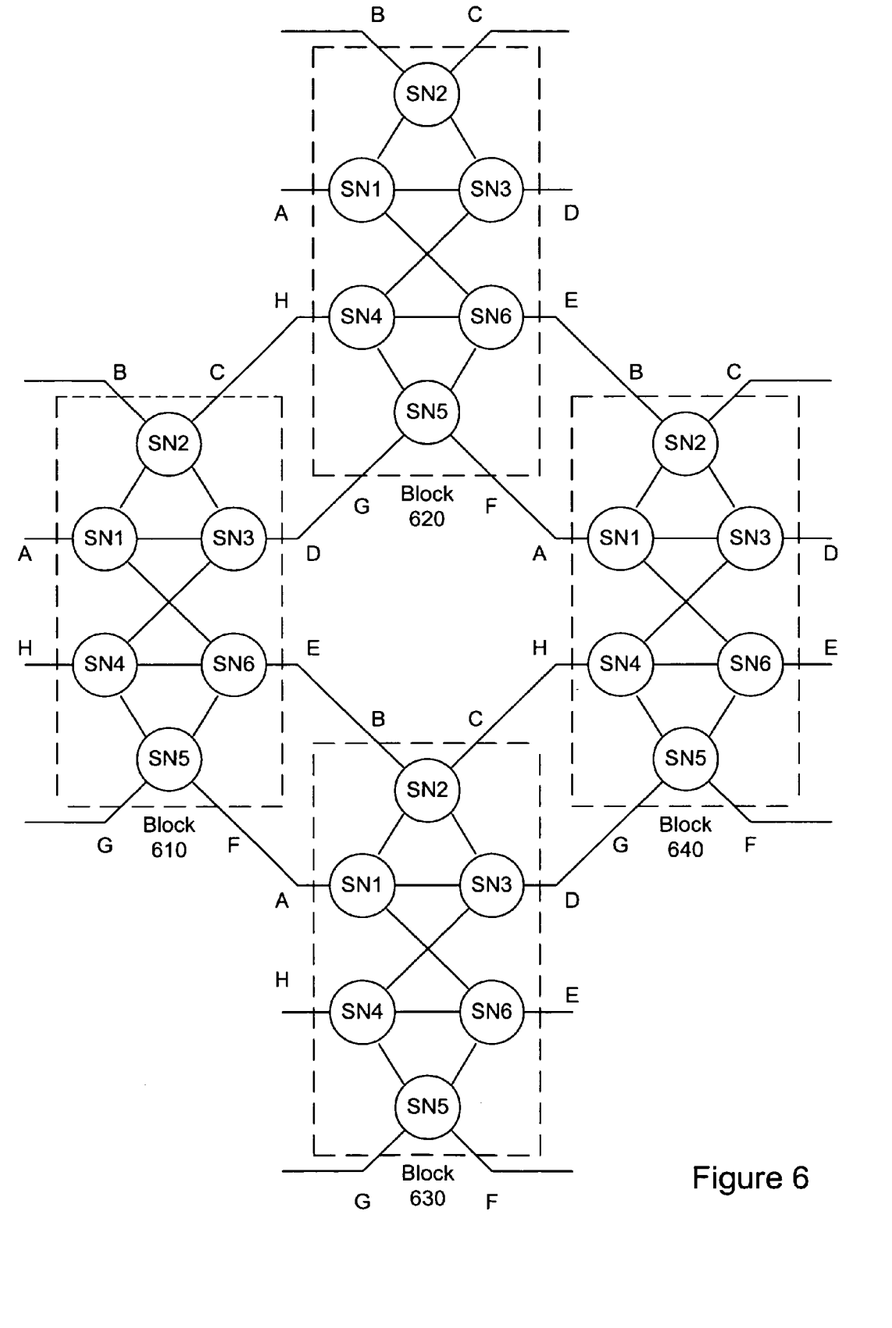
FIG. 6 is a block diagram conceptually illustrating interconnection of multiple server blocks according to one embodiment of the present invention.

Several server blocks 500 can be interconnected to form a larger network of servers. FIG. 6 is a block diagram conceptually illustrating interconnection of multiple server blocks according to one embodiment of the present invention. Here, four server blocks 610–640 are interconnected to form a server network. In such a network, at least two nodes of a block are connected to at least two nodes of another block. In the example illustrated in FIG. 6, block 610 is connected with block 620 and block 630. Server node SN2 of block 610 is connected to server node SN4 of block 620 and server node SN3 of block 610 is connected to server node SN5 of block 620. Likewise, server node SN3 of block 610 is connected to server node SN1 of block 630 and server node 5N6 of block 610 is connected to server node SN2 of block 630. Further, in this example, block 620 and block 630 are connected in a similar manner to block 640.

Each server block 610–640 has a total of eight external connections A–H. Those connections not used for interconnecting to another server block are available for connection to an external network. For example, block 610 has four connections available for connection to an external network A, B, G, and H. Each of the other blocks 620–630 likewise have four connections available for connection to an external network. Block 620 has connections A–D, block 630 has connections E–H and block 640 has connections C–F all available for connection to an external network.

As explained above, each server node is connected to at least two other server nodes in the network. Further, each server node has integral switching and routing capabilities. Interconnections of server blocks as illustrated in FIG. 6 makes efficient use of the switching and routing capabilities of the individual server nodes and creates a highly fault tolerant server network. For example, if server node SN5 of block 620 were to fail, the network could still operate normally. Once server node SN5 of block 620 failed, the neighboring nodes such as server nodes SN4 and SN6 of block 620, SN3 of block 610, and SN1 of block 640 would detect the failure and remove the failed nodes from their routing tables. Transactions passing through the neighboring nodes could then be routed around the failed node and thereby allow the network to function with a minimum of disruption.

A network constructed of servers nodes having four ports in the manner illustrated with reference to FIG. 6 will have some practical size limitations. Using server nodes with four ports limits the network size to approximately 200 nodes. In alternative embodiments of the present invention, each server node may have more than four ports. For example, each server node may have six ports. With six ports, the basic server block structure illustrated with reference to FIG. 3 may be maintained with the addition of two more ports available for connection to other blocks. These additional ports can be used to extended the network described with reference to FIG. 6 into a three dimensional topology. By using server nodes with six ports and a three dimensional topology, highly fault tolerant networks can be constructed which use up to 512 server nodes.

Figure 7:
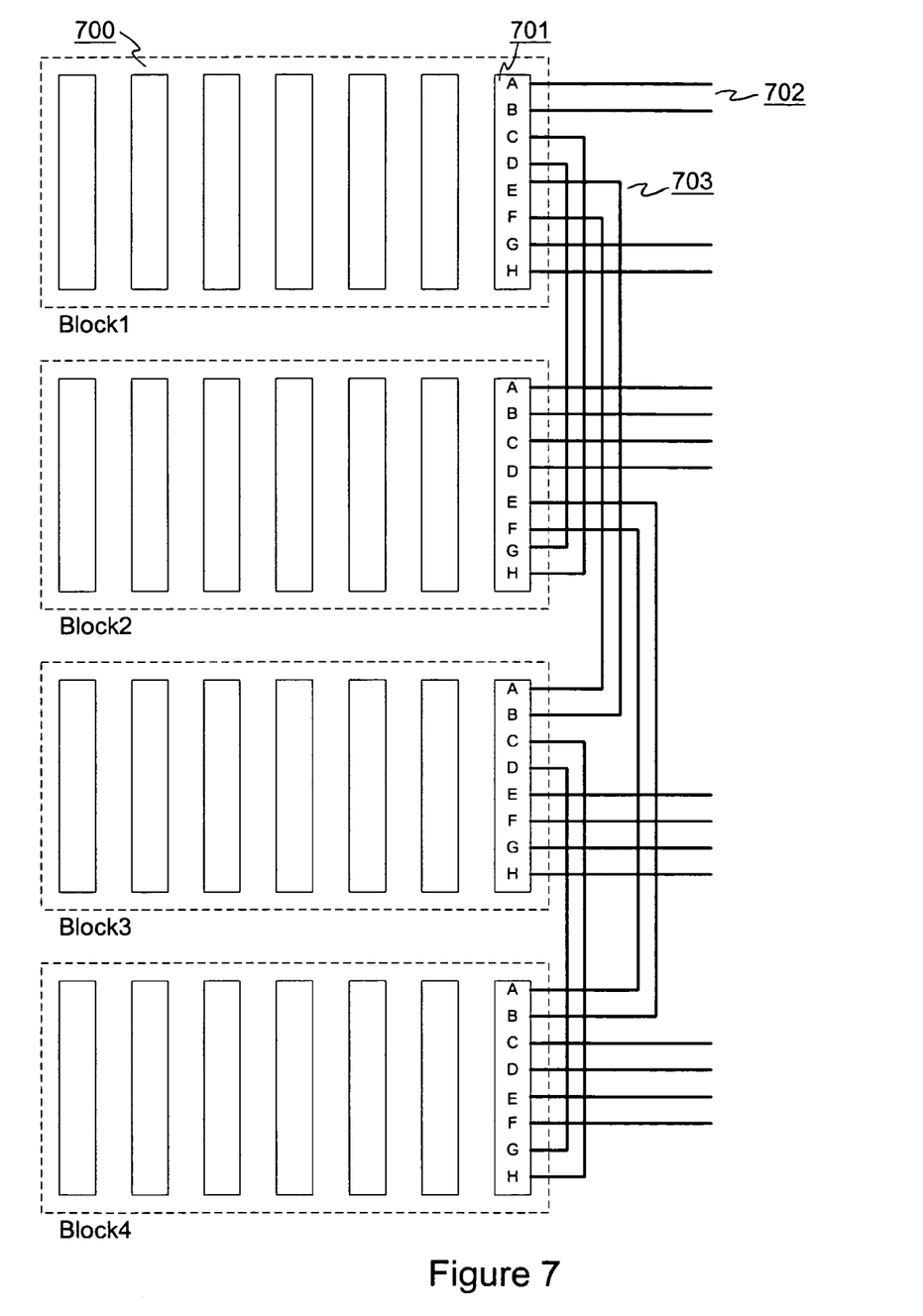
FIG. 7 is a block diagram illustrating physical interconnection of multiple server blocks within multiple card racks according to one embodiment of the present invention.

As explained above, each server node can be constructed on a single printed circuit board that can then be mounted in a card rack and configured to form a server block. These rack mounted server blocks can then be interconnected to form a server network. FIG. 7 is a block diagram illustrating physical interconnection of multiple server blocks within multiple card racks according to one embodiment of the present invention. In this example, four blocks block 710–block 740 are illustrated. Each block constructed in a card rack consists of server node cards 700 and an interface card 701. The interface cards 701 provide connections to external networks or devices as well as allow interconnection to other blocks 703 to form a server network. In this manner, a highly fault tolerant and easily scalable network can be built.

Figure 8:
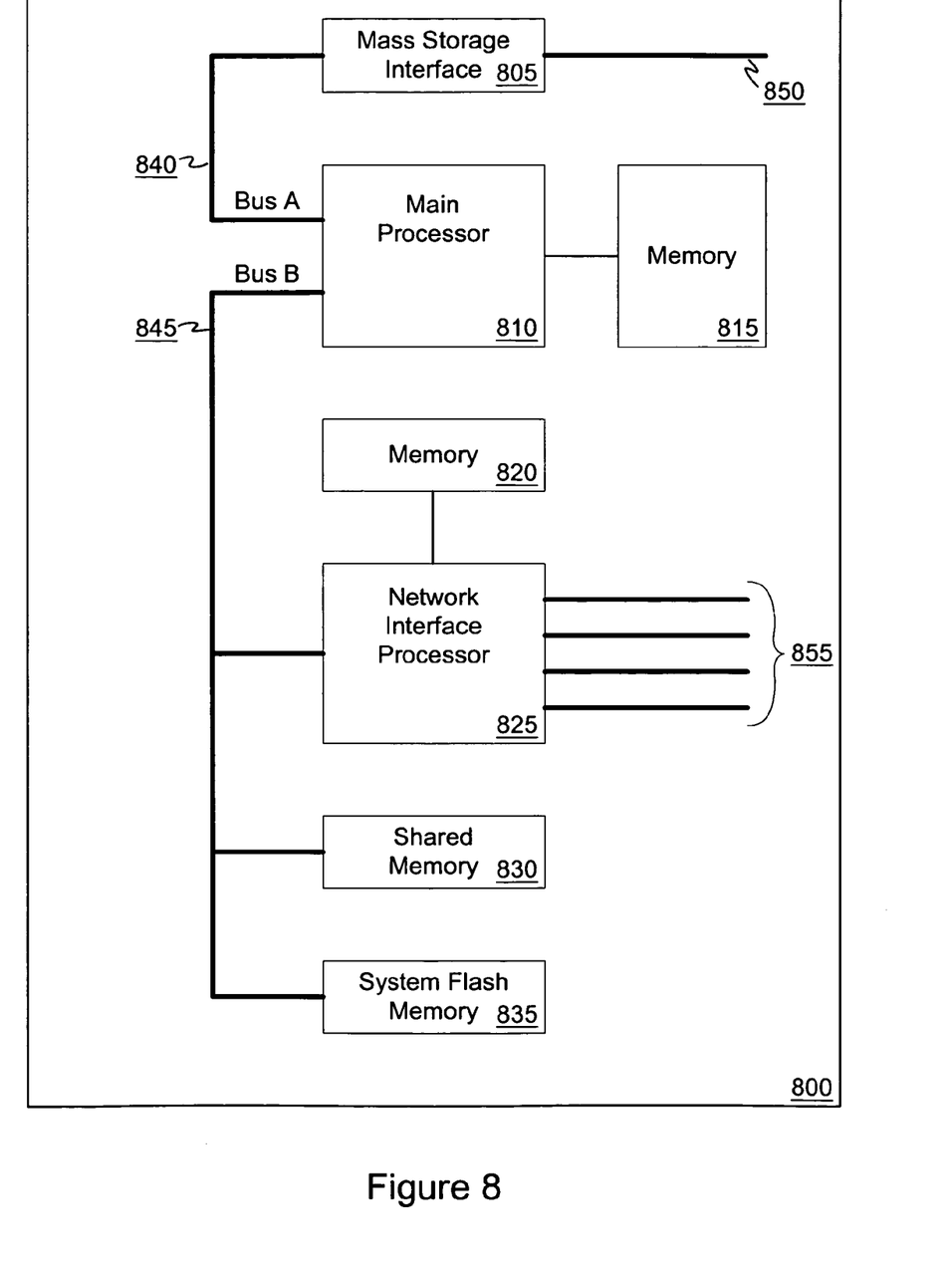
FIG. 8 is a block diagram of a server node board according to one embodiment of the present invention.

FIG. 8 is a block diagram of a server node board according to one embodiment of the present invention. Each server node 800 contains a main processor 810 and a network interface processor 825. The main processor 810 with its dedicated memory 815 is connected through bus A 840 to a mass storage interface 805. This interface 805 provides a connection 850 to external storage devices (not shown) such as disk arrays. The main processor 810 is connected through bus B 845 to the network interface processor 825, shared memory 830, and system flash memory 835. The system flash memory 835 provides system operation instructions to both the main processor 810 and the network interface processor 825. The network interface processor 825 with its dedicated memory 820 provides the server node ports 855 and performs network functions including switching, routing, load balancing and fail-over processing. The shared memory 830 is used by both the main processor 810 and the network interface processor 825. This memory 830 is used to store message packets sent and received through the network interface processor 825.

What is claimed is:

1. An apparatus comprising:
   a card rack;
   a plurality of server node cards mounted on the card rack;
   an interface card mounted on the card rack separate from the plurality of server node cards, the interface card to provide an external connection to another card rack mounted with other server node cards and to provide a connection to an external network;
   wherein each of the plurality of server node cards include:
      a server to perform integrated switching, routing, load balancing, and fail-over functions;
      a plurality of ports, wherein at least one port to directly connect to another server node card in the card rack and at least one port to connect to the interface card to access the external connection to the another card rack including the other server node cards; and
      a routing table comprising no more than routing information of the directly connected server node cards in the card rack and the immediate connected interface card; and
   wherein the interface card to connect to each of the server node cards in the card rack via interconnections to at least one of the ports of each of the server node cards.

2. The apparatus of claim 1, wherein the server node cards and the interface card each comprises a single printed circuit board.

3. The apparatus of claim 1, where the plurality of ports comprises four ports.

4. The apparatus of claim 2, wherein the printed circuit board is rack mountable and the plurality of ports are accessible as connection points on the card rack.

5. The apparatus of claim 1, wherein to perform routing functions further includes:
   receiving a request at a particular server node card;
   determining whether to service the request; and
   if unable to service the request, routing the request to a different server node card coupled with the particular server node card in the card rack.

6. The apparatus of claim 5, wherein to perform load balancing functions further includes:
   determining the present load of other one or more server node cards coupled with the particular server node card in the card rack; and
   routing the request to a determined server node card with the smallest load of the other one or more server node cards.

7. A server block comprising:
   a plurality of server node cards;
   an interface card mounted on the server block separate from the plurality of server node cards, the interface card to provide an external connection to another server block mounted with a plurality of other server node cards and to provide a connection to an external network;
   wherein each of the plurality of server node cards include:
      a server to perform integrated switching, routing, load balancing, and fail-over functions;
      a plurality of ports, at least one port of the plurality of ports configured to directly connect to another server node card and at least one port configured to connect to the interface card to access the external connection to the another server block including the plurality of other server node cards; and a routing table comprising no more than routing information of directly connected server node cards in the server block and the immediate connected interface card; and wherein the interface card to connect to each of the server node cards in the server block via interconnections to at least one of the ports of each of the server node cards.

8. The server block if claim 7, wherein each said server node card and the interface card each comprise one printed circuit board.

9. The server block of claim 8, wherein the printed circuit board is rack mountable and the plurality of ports of each server node cards are accessible as connection points on a card rack, and the server block is constructed in the card rack by interconnecting the connection points on the card rack.

10. The server block of claim 7, wherein to perform routing functions further includes:
receiving a request at a particular server node card;
determining whether to service the request; and
if unable to service the request, routing the request to a different server node card coupled with the particular server node card in the server block.

11. The server block of claim 10, wherein to perform load balancing functions further includes:
determining the present load of other one or more server node cards coupled with the particular server node card in the server block; and
routing the request to a determined server node card with the smallest load of the other one or more server node cards.

12. A computer network comprising:
a plurality of server blocks wherein each server block comprising:
a plurality of server nodes;
an interface card mounted on the server block separate from the plurality of server nodes, the interface card to provide an external connection to another server block mounted with a plurality of other server node cards and to provide the external connection to the network;
wherein each of the plurality of server nodes include:
a server to perform integrated switching, routing, load balancing, and fail-over functions;
a plurality of ports, at least two ports of the plurality of ports configured to directly connect to at least two other server nodes of the plurality of server nodes in the server block and at least one port configured to connect to the interface card to access the external connection to the another server block including the plurality of other server node cards;
a routing table comprising no more than routing information of directly connected server nodes in the server block and the immediate connected interface card; and
wherein the interface card to connect to each of the server nodes in the server block via interconnections to at least one of the ports of each of the server nodes.

13. The computer network of claim 12, wherein each server node and the interface card each comprise one printed circuit board.

14. The computer network of claim 13, wherein the printed circuit board is rack mountable and the plurality of ports of each server node are accessible as connection points on a card rack, and each server block is constructed in the card rack by interconnecting the connection points on the card rack.

15. The computer system of claim 12, wherein to perform routing functions further includes:
receiving a request at a particular server node;
determining whether to service the request; and
if unable to service the request, routing the request to a different server node coupled with the particular server node in the server block.

16. The computer system of claim 15, wherein to perform load balancing functions further includes:
determining the present load of other one or more server nodes coupled with the particular server node in the server block; and
routing the request to a determined server node with the smallest load of the other one or more server nodes.

* * * * *